Patented June 18, 1946

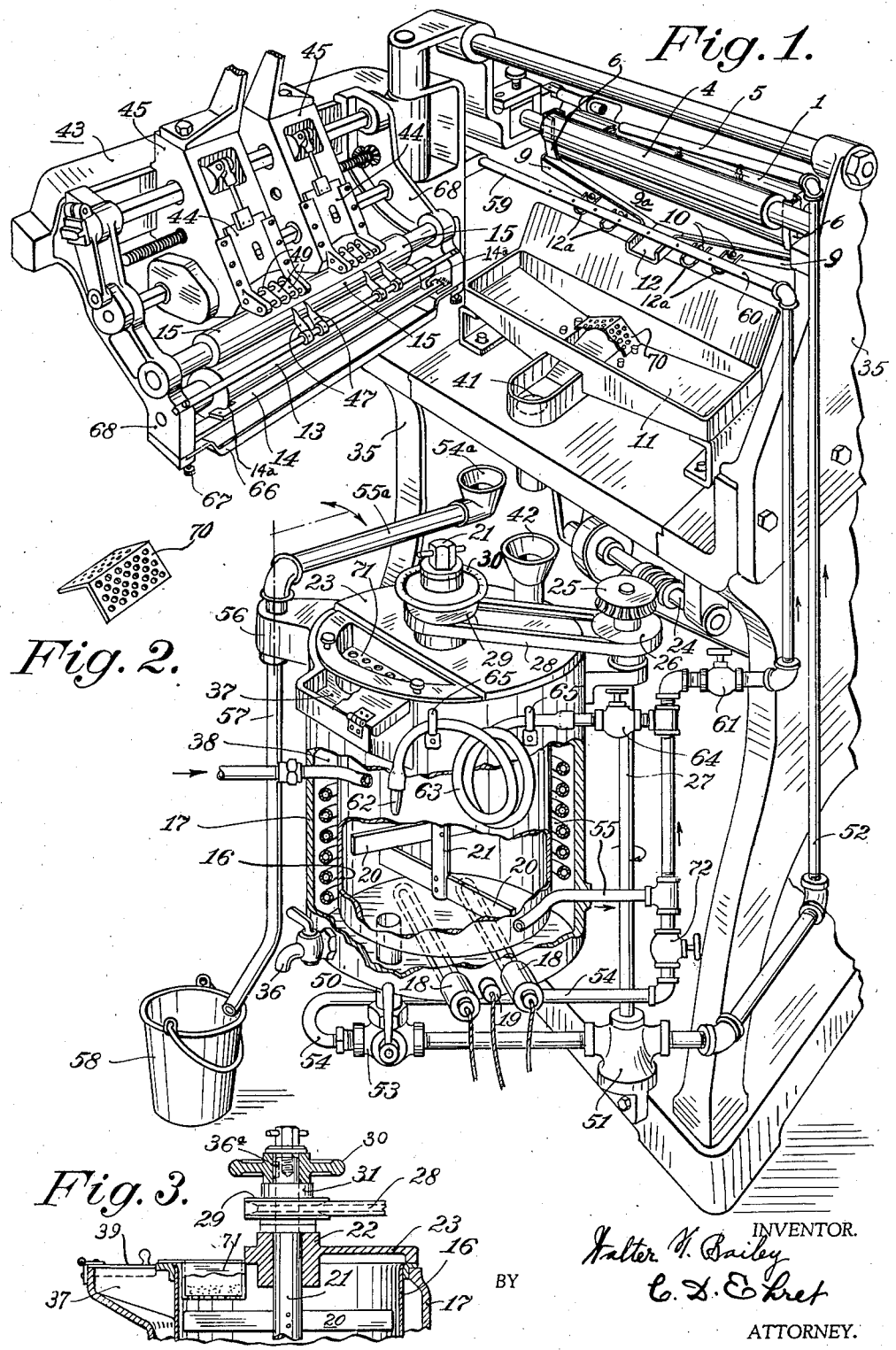

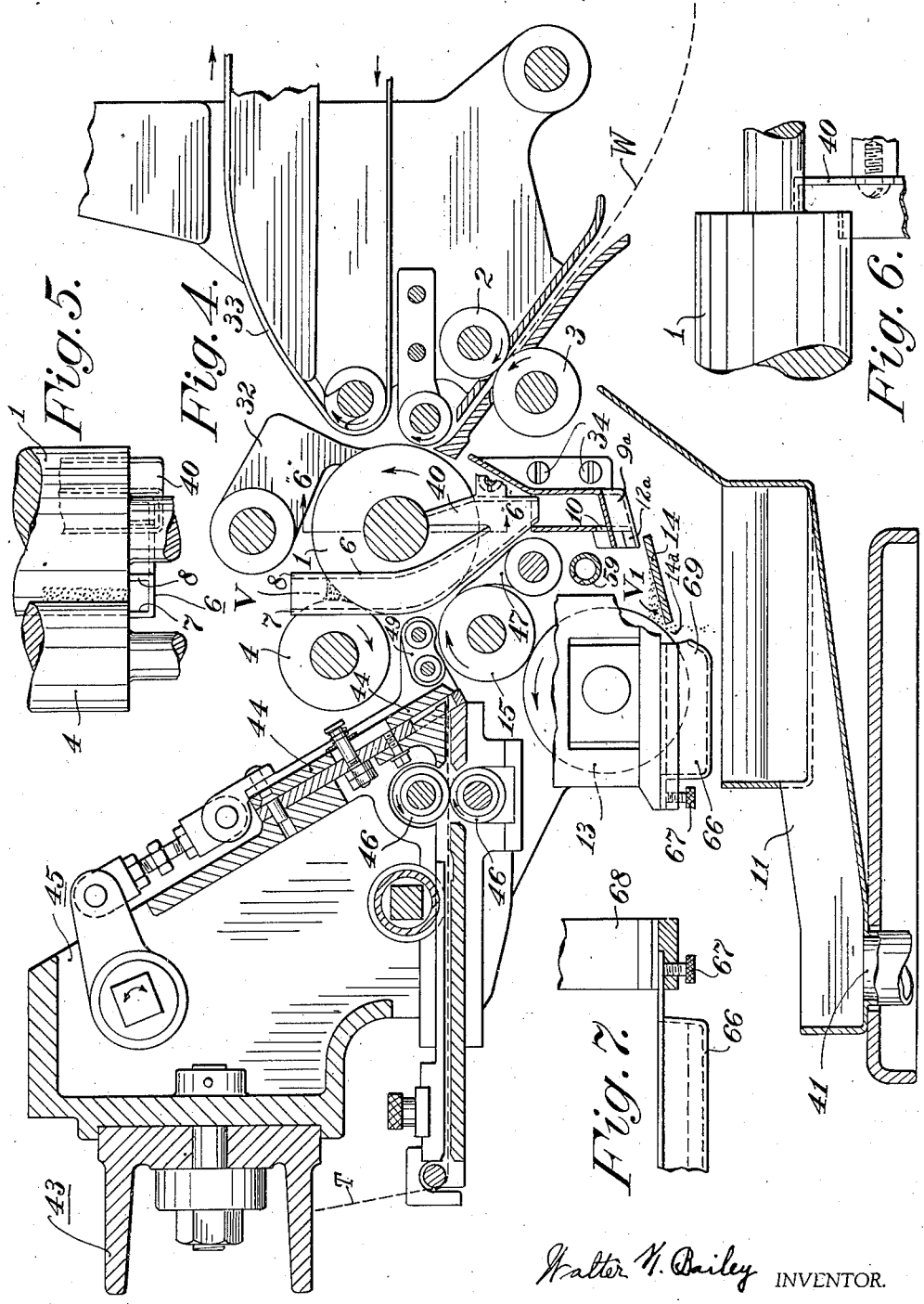

2,402,272

UNITED STATES PATENT OFFICE 2,402,272

ADHESIVE APPLYING APPARATUS

Walter T. Bailey, Philadelphia, Pa., assignor to Stokes and Smith Company, Philadelphia, Pa., a corporation of Pennsylvania Application January 4, 1943, Serial No. 471,268

16 Claims. (Cl. 91—49)

My invention relates to apparatus for applying adhesive to wrappers, labels, tabs, and the like, generically termed "sheets," to be applied to stayed or unstayed boxes, and, in particular, concerns apparatus which effects adhesive attachment of tabs to wrappers and coats the tabbed wrappers with adhesive for attaching them to boxes or the like.

In accordance with my invention, the usual open reservoir of adhesive, disposed beneath the adhesive applying roll or rolls and associated feeding and/or sheet-coating mechanism, and in which the adhesive is agitated by a roll which transports the adhesive therefrom more or less directly to the sheet applying rolls, is dispensed with in avoidance of disadvantages including foaming of the adhesive and of condensation of adhesive-bearing vapors upon the rolls and the feeding or coating mechanism. In substitution for such reservoir, the adhesive is supplied by a pump from a reservoir the space above whose contents is substantially isolated from the rolls and in which the adhesive is agitated by a paddle or equivalent structure which preferably remains below the surface of the adhesive and which is discharged to the pump from an outlet at or near the bottom of the reservoir.

Further in accordance with my invention, the adhesive is delivered by the pump to a valley formed by an adhesive applying roll and an associated scraper member extending lengthwise thereof, and the excess of adhesive is collected at the ends of the valley by trough structure which directs it to a lower valley formed by a second roll and scraper arrangement.

My invention further resides in features of construction and arrangement hereinafter discussed and in general is directed to improvements in adhesive-applying apparatus of the type disclosed in Letters Patent 2,276,683 to Bailey, Letters Patent 2,028,878, 1,857,260, 1,806,181, to Rider, Letters Patent 728,086 and 1,818,198 to Davis, and in applications Serial Numbers 397,894 and 430,560 filed June 6, 1941 and February 12, 1942.

For an understanding of my invention reference is made to the accompanying drawings, in which:

Fig. 1, in perspective, and with parts broken away, illustrates a mechanism for applying adhesive to wrappers and tabs;

Fig. 2, in perspective, shows strainer structure comprised in apparatus of Fig. 1;

Fig. 3 is a sectional view of a slip-clutch or friction-drive device included in the mechanism of Fig. 1;

Fig. 4 is a side view, principally, on enlarged scale and in section, of parts appearing in Fig. 1;

Fig. 5 is a fragmentary plan view of rolls and trough structures shown in Figs. 1 and 4;

Fig. 6 is a fragmentary side-elevational view of roll and scraper structure shown in Fig. 4;

Fig. 7 is a fragmentary end view of drip pan structure shown in Fig. 4.

Referring to Figs. 1 and 4, the roll 1 of the adhesive-applying machine co-operates with a scraper member or roll 4, preferably an intermittently operated doctor roll, to define a valley, Fig. 4, V into which adhesive is discharged from a pipe 5 preferably extending above the valley to a point substantially removed from both ends of roll 1 and preferably, for uniformity of the coating upon roll 1, provided with a plurality of perforations spaced lengthwise of the valley and through which the adhesive is discharged as a plurality of jets.

The surface of roll 1 in passing through the adhesive in valley V receives a thin uniform coating transferred to wrappers W fed to roll 1 by rolls 2, 3 and deflected therefrom as by knives 32 onto the conveyor 33 which transports them to a station not shown at which they are applied to stayed or unstayed boxes. The tabs cut from strips T depending upon their location serve to reinforce and/or stay corners of the box; the wrapper itself also serves to reinforce or stay the box-corners.

The excess of adhesive supplied to the valley V flows towards the ends thereof and is collected by trough structures 6 each preferably of width suited to straddle the valley with the substantially vertical sides 7, 8 of the trough in engagement respectively with the ends of rolls 4 and 1. The two streams of adhesive collected by the troughs 6 flow downwardly and toward one another (Fig. 1) as directed by chutes 9, 9 of collector member 9a. Some of the adhesive escapes from the openings 10 in chutes 9, 9 for discharge from the series of troughs 12a spaced lengthwise of a second valley VI; the remainder of the adhesive reaches the common spout 12; thus the adhesive is discharged from member 9a as a thin wide stream (Fig. 4) into the aforesaid second valley VI defined by the roll 13 and associated scraper member 14. When the frame or bridge 43 is swung away from the position shown in Fig. 4 to the position shown in Fig. 1, for cleaning or inspection, the adhesive or cleansing liquid discharges from spout 12 directly into tray 11 instead of into valley V1. Tray 11 is detachable to allow cleaning desirable at rather infrequent intervals.

Preferably there is associated with each end of roll 1, a scraper member 40 which removes therefrom adhesive which has escaped entrapment by the trough 6 and diverts it to the chutes 9, 9 of the collection structure. Preferably, as shown, the troughs 6, 6, chutes 9, 9, spout 12 and end scrapers 40 are comprised in or form structural units attached, as by screws 34, to the side frames 35 of the machine G.

The roll 13 transports or transfers adhesive form the lower valley V1 to the roll 15 which as now described applies adhesive to the faces of tabs destined to engage wrappers or sheets fed by rolls 2 and 3 into engagement with roll 1. As more fully disclosed and described in aforesaid patents, the tabs are cut from strips of sheet tabbing material by knives 44, respectively associated with two similar tabbing heads 45 adjustably supported by the frame of bridge member 43 for movement toward and from each other to suit the spacing between tabs to wrappers of different widths; when tabs only are to be applied a different arrangement similar to that of aforesaid Davis Patent 728,086 is utilized. Reverting to Figs. 1 and 4 hereof, while the knives 44 are in their upper or retracted position, each of the tab strips is fed by a pair of rolls 46, 46 to extend beyond the path of the associated knife corresponding with the desired length of a tab: the leading end of the strip is directed by guide elements 49 into engagement with the tab-coating roll 15. Upon downward movement of the knives to sever the tab strips, a tab is cut from the leading end of each strip and the tabs so formed are carried by roll 15 toward roll 1 onto which they are deflected by the stripper blades 47.

During transport of the tabs by roll 15, their wrapper-engaging faces receive a coating of adhesive which is more viscous, because of its lower temperature and/or the churning received in valley V, than the adhesive applied by roll 1 to the other or box-engaging faces of the tabs. This difference in viscosity is desirable because quicker setting of the adhesive attaching the tabs to the wrappers minimizes possibility of displacement of the tabs during the application of the tabbed wrappers to boxes at which time the adhesive on the box-engaging faces of the wrappers and tabs should be set to substantially lesser degree.

Unlike prior arrangements, such as those of aforesaid Rider Patents 1,857,260 and 2,028,878, my roll 13 does not dip below the surface of a large open body of adhesive agitated or stirred by the roll with consequent undesirable production of foam and escape of adhesive-bearing vapors. With the present improved arrangement, the coating of adhesive transferred to roll 15 is free of blisters, craters and like irregularities due to foam and is of consistency or viscosity not subject to variation because of condensation on the rolls of adhesive-bearing vapors.

The excess of adhesive supplied to valley V1 flows from the ends thereof, through the gaps 14a in the scraper or doctor blade 14, into tray 11 whose bottom is inclined downwardly and forwardly to an outlet 41 disposed above the funnel or equivalent member 42 for return of the adhesive to a container 16 which serves as a reservoir of capacity sufficient for an extended run, for example, of one day or several thousand boxes: this is in contrast with aforesaid prior arrangement in which the large shallow tray of adhesive needed replenishment as often as eight to twelve times per day.

The space or chamber 38 between the container 16 and an outer container 17 is filled with water maintained, when "hot" glue is used, at suitably high temperature by electric heaters 18, or equivalent source of heat, controlled by thermostat 19. A switch, not shown, allows de-energization of the heaters when "cold" glue is used. Chamber 38 may be drained by opening faucet 36 and re-filled through the opening 37 exposed when the cover member 39 is opened; because the water in chamber 38 is used only for heating and does not come into contact with adhesive it need be replaced only infrequently.

The adhesive within the container 16 is continuously agitated by paddle 20, or equivalent, whose blades slowly rotate below and generally parallel to the surface of the glue to maintain uniformity of its characaeristics, dependent upon composition and temperature, essential to maintenance of high rate of useful production of boxes. With fall in level of the adhesive, each paddle in turn rotates at or immediately above the surface of the adhesive to break any bubbles that may form due to entrapment of air by adhesive falling from tray 11 back into the main body thereof.

The shaft 21 to which the paddle 20 is attached (Figs. 1 and 3) is supported by bearing 22 in the cover member 23 of the container 16, 17 and is driven from the continuously rotating shaft 24 of mechanism G through the gear 25 and pulley 26 attached to shaft 27, belt 28 and pulley 29 rotatable on shaft 21 and connected thereto through the friction or slip clutch comprising member 30 attached, as by key 36a for rotation with shaft 21, and member 31 attached to or integral with pulley 29.

The slip clutch precludes breakage of any of the mechanism in event of inadvertent attempt to start the machine when the glue is hard and allows rapid manual operation of the paddles by hand wheel 30 after addition of water or glue thus more quickly to procure uniformity.

In normal use of the machine for applying adhesive to wrappers and tabs, the adhesive flows from the bottom of the tank through pipe 50 to the pump 51, preferably disposed below the level of the bottom of the tank 16 in avoidance of presence of foam in the pumped adhesive, connected by piping 52 to the spray or distributing head 5 disposed above the upper valley V between the rolls 1 and 4. The pump 51 may be of simple rotary impeller type having its movable element attached to or driven from shaft 27. The adhesive not applied to the wrappers and tabs is returned by gravity, as above described, to tank 16 in which it is mixed with the main body of the adhesive.

The confinement of the adhesive within closed container 16 and the substantial capacity of the container minimize variations, otherwise occurring during a working day, of the characteristics of the adhesive applied to the wrappers and tabs. With prior arrangement, using an open reservoir, it was necessary frequently to add water in replacement of evaporization losses. Confinement of the adhesive also prevents its contamination by lint, dust, scraps of paper and other foreign matter. The isolation of the space above the heated adhesive precludes condensation of adhesive-bearing vapors upon the wrappers or tabs or upon the elements of the wrapper-feeding, tab-cutting and strip-feeding mechanisms. There is thus avoided need frequently to clean those elements to ensure their proper operation.

When, at the end of a day's run, it is desired to clean the machine including removal of adhesive from rolls 1, 4, 13, 15 for example, the two-way valve 53 is operated to disconnect the pump 51 from the reservoir 16 of adhesive and, after suitable interval for drainage of adhesive from the rolls, to connect it, as by pipe 54, to a source of water or other cleansing liquid. Preferably, and necessarily when "hot" glue has been used, the cleaning fluid is preheated by its passage through coil 55, or equivalent heat-exchange device, disposed within chamber 38.

With the bridge or frame 43 in normal operating position, the water flows along the same paths previously traversed by adhesive and so removes all trace thereof from the rolls, scrapers and associated parts. However, the contaminated cleaning liquid is not, for ordinary cleaning, permitted to flow to the reservoir or inner container 16 but is diverted therefrom to waste. More particularly, as the cleaning liquid falls from the tray outlet 41 toward the funnel 42 of the inner container 16, it is intercepted by funnel 54a carried by pipe 55a and moved, when the liquid falling toward funnel 42 appears to contain a substantial percentage of water, to position between outlet 41 and funnel 42. The bracket 56 in which pipe 55a is pivotally mounted may extend from and form an integral part of the outer container 17. The movable waste pipe 55a is in continuous communication with pipe or hose 57 which discharges the used cleaning liquid to any suitable destination such as, for example, the bucket 58. Usually not more than a gallon or two of water is required to obtain thorough cleaning.

To ensure and hasten removal of adhesive from the tab-engaging roll 15, there is provided spray head or pipe 59 which extends between the frame members 35 of the machine in such position that when the tabbing mechanism is in operating position (Fig. 4), jets of cleaning liquid issuing from the perforations 60 in the pipe 59 are directed into the bight of rolls 13 and 15. The pipes 5 and 59 may be concurrently supplied with cleansing liquid from coil 55 by opening both valves 61 and 72.

With the frame 43 swung to the position shown in Fig. 1, valve 61 at this time being closed, the cleaning liquid from pipe 5, after washing off the rolls 1, 4, the troughs 6 and chutes 9, is directly discharged from trough 12 into the tray 11. With the bridge 43 in such position, the aforesaid parts are exposed for still further cleaning if the operator finds that desirable and necessary. That parts otherwise difficult to clean may be reached by the liquid, there may be provided, for manipulation by the operator, a nozzle 62 attached to flexible hose 63 and adapted by opening of valve 64 to be placed in communication with coil 55 or equivalent source. When not in use, the hose 63 may be coiled and held in readily accessible position by clips 65 attached to the outer container 17.

To prevent the cleaning liquid, or diluted adhesive, from dripping onto the bed of the machine, upon the container 17, or any of the paddle-driving mechanism, as the tabbing mechanism is moved to or is in the position shown in Fig. 1, there is provided the shallow tray or pan 66 detachably secured by thumb screws 67 to the side frames 68 of bridge 43. As more clearly shown in Fig. 4, the tray 66 is of such width, or so disposed, that the lip or forward edge 69 does not, in normal operation of the machine, intercept adhesive falling from the valley V1 into the tray 11.

In contrast with the cleaning afforded by the constructions disclosed in aforesaid patents and more fully described in Letters Patent 1,433,976 to Weightman et al., the present arrangement is far more rapid and thorough with consequent substantial improvement in quantity and quality of the boxes produced.

To prevent entry of foreign matter such as tab clippings into the adhesive-circulation system, there may be provided the removable screen 70 for covering the drain opening in the bottom of tray 11 and the screen member 71 for covering the opening through which the inner container or reservoir 16 receives fresh supply of adhesive.

For brevity in the appended claims the term "sheets" is used generically to comprehend wrappers, labels, tabs, and tabbed wrappers or labels.

What I claim is:

1. Apparatus for applying adhesive to sheets for attachment thereof to boxes comprising in combination with a sheet-engaging roll, a scraper member extending lengthwise of said roll and therewith defining a valley, means for delivering adhesive to said valley, and means for conducting excess adhesive from said valley comprising trough structure consisting of an open channel at least at one end of the valley and at its edges engaging said roll and said scraper member on opposite sides of the valley and along the end faces of said roll and scraper member there to effect a closed passage discharging adhesive below said sheet-engaging roll.

2. Apparatus for applying adhesive to sheets and tabs for attachment thereof to boxes comprising a roll for applying adhesive to the sheets and to one side of each of the tabs, a scraper member extending lengthwise of the roll and therewith defining a valley, a second roll, a scraper member extending lengthwise thereof and therewith defining a second valley, means for feeding sheets into engagement with one of said rolls, means for delivering adhesive to said first-named valley, means for directing flow of adhesive from said first-named valley to said second valley, and a roll applying adhesive, delivered from second valley by said second roll, to the other sides of the tabs.

3. Apparatus for applying adhesive to wrappers and tabs comprising a wrapper-engaging roll, a scraper member extending lengthwise thereof to define between them a valley, a tab-engaging roll adjacent said first roll for transfer thereto of tabs, a roll for transferring adhesive to said tab-engaging roll, a scraper member extending lengthwise of said transfer roll therewith to define a second valley lower than the first-named valley, means for delivering liquid adhesive to said first valley for application to the box-engaging faces of the wrappers and tabs, and means providing for application of more viscous adhesive to the wrapper-engaging faces of the tabs comprising means for directing flow of excess adhesive from said upper valley to said lower valley.

4. Apparatus for applying adhesive to sheets for attachment thereof to boxes comprising rolls disposed one above another, a scraper member extending lengthwise of each of said rolls and therewith defining a valley, means for delivering liquid adhesive to one of said valleys for application to one face of the sheets, and means providing for application of more viscous adhesive, received in a lower of said valleys from said one of said valleys, to the other face of said sheets comprising structure for collecting adhesive from an upper of said valleys and directing it into a lower of said valleys.

5. Apparatus for applying adhesive to wrappers and tabs comprising a wrapper-engaging roll, a scraper member extending lengthwise thereof and therewith defining a valley, means for directing flow of excess adhesive from the ends of said valley comprising trough structure, a tab-engaging roll, a roll for transferring adhesive to said tab-engaging roll, a second scraper member extending lengthwise of said transfer roll and therewith defining a second valley, and a frame supporting said second scraper member and said transfer and tab-engaging rolls for movement toward and from position in which adhesive from said trough structure flows into said second valley.

6. Apparatus for applying adhesive to wrappers and tabs comprising a wrapper-engaging roll, a scraper member extending lengthwise thereof and therewith defining a valley, means for directing flow of excess adhesive from the ends of said valley comprising trough structure, a tab-engaging roll, a roll for transferring adhesive to said tab-engaging roll, a second scraper member extending lengthwise of said transfer roll and therewith defining a second valley, a frame supporting said second scraper member and said transfer and tab-engaging rolls for movement toward and from position in which adhesive from said trough structure flows into said second valley, and a tray for receiving adhesive from said second valley when said movable frame is in aforesaid position and for receiving adhesive from said trough when said frame is away from said position.

7. Apparatus for applying adhesive to wrappers and tabs comprising a wrapper-engaging roll, tabbing mechanism including a tab-engaging roll, a supply of adhesive, means for heating the adhesive, a reservoir for heated adhesive substantially closed and so arranged relative to said mechanism and said rolls that vapors from the heated adhesive within the reservoir will not reach and condense upon said mechanism and said rolls, and means effecting circulation of adhesive in a path including said rolls and said reservoir.

8. Apparatus for applying adhesive to sheets for attachment thereof to boxes comprising rolls disposed one above another, a scraper member extending lengthwise of each of said rolls therewith to define a valley, a reservoir for adhesive, means for withdrawing adhesive from said reservoir and delivering it to a higher of said valleys, means for directing flow of excess adhesive from the higher valley to a lower valley, and tray structure for receiving adhesive from the lower valley and for returning it to said reservoir.

9. Apparatus for applying adhesive to sheets for attachment thereof to boxes comprising a roll, a scraper member extending lengthwise of said roll therewith to define a valley, a reservoir provided with an opening for receiving adhesive, means for collecting excess of adhesive supplied to said valley including a tray from which adhesive falls into said opening, an adhesive-supply system including a pump for withdrawing adhesive from said reservoir and delivering it to said valley, and means for removing adhesive at least from said roll, said member and said pump comprising means for introducing cleaning liquid into said system in advance of said pump and in substitution for adhesive, and means for intercepting and diverting the cleaning liquid as it falls from said tray toward said opening in said reservoir.

10. Apparatus for applying adhesive to wrappers and tabs comprising, in combination with a wrapper-engaging roll and a tab-engaging roll, a roll for transferring adhesive to said tab-engaging roll, a liquid distribution system comprising a pump, a discharge pipe extending therefrom to said wrapper-engaging roll, structure directing excess of liquid from said wrapper-engaging roll to said transfer roll, a reservoir containing adhesive and having an opening to receive adhesive, a tray for collecting unused adhesive from which it falls into said opening, a spray-head for directing jets of cleaning liquid into the bight of said transfer roll and said tab-engaging roll, means operable selectively to supply adhesive or cleansing liquid to said liquid-distribution system, means to supply cleansing liquid to said spray-head, and means for intercepting and diverting the cleansing liquid as it falls from said tray toward said opening in said reservoir.

11. Apparatus for applying adhesive comprising an inner container for adhesive, an outer container cooperating with said inner container to define a chamber for hot fluid, a heat-exchange device disposed in said chamber and traversed by cleansing liquid, an adhesive-applying member, a liquid-distribution system including a pump and a discharge-connection therefrom for supplying liquid to said member, and valve means for selectively connecting the intake of said pump to said inner chamber or to said heat-exchange device.

12. Apparatus for applying adhesive to sheets comprising, in combination with sheet-coating mechanism including a sheet-engaging roll, means for supplying adhesive to said roll, a reservoir for adhesive, means effecting flow of adhesive in a path including said mechanism and said reservoir, means for supplying cleansing liquid, means for heating said liquid. means for disconnecting said second-named means from said reservoir and connecting it with said liquid supplying means for withdrawing liquid therefrom through the first-named means, and a connection from the discharge of said first-named means for delivering cleansing liquid to said sheet-coating mechanism.

13. Apparatus for applying adhesive to sheets comprising, in combination with sheet-coating mechanism including a sheet-engaging roll, means for supplying adhesive to said roll, a reservoir for heated adhesive substantially closed and so arranged relative to said mechanism and said rolls that vapors from the heated adhesive within the reservoir will not reach and condense upon said mechanism and said rolls, means effecting flow of adhesive in a path including said mechanism and said reservoir, means for supplying cleansing liquid, means for heating said liquid, means for disconnecting said second-named means from said reservoir and connecting it with said liquid supplying means for withdrawing liquid therefrom through the first-named means, and a connection from the discharge of said first-named means for delivering cleansing liquid to said sheet-coating mechanism.

14. Apparatus for applying adhesive to sheets comprising, in combination with sheet-coating mechanism including a sheet-engaging roll, means for supplying adhesive to said roll, a reservoir for adhesive, means effecting flow of adhesive in a path including said mechanism and said reservoir, means for supplying cleansing liquid, means for heating said liquid, means for disconnecting said second-named means from said reservoir and connecting it with said liquid supplying means for withdrawing liquid therefrom through said second-named means, a connection from the discharge of said second-named means for delivering cleansing liquid to said sheet-coating mechanism, and means for returning adhesive-containing liquid from said mechanism into said reservoir.

15. Apparatus for applying adhesive to sheets comprising, in combination with sheet-coating mechanism including a sheet-engaging roll, means for supplying adhesive to said roll, a reservoir for adhesive, means effecting flow of adhesive in a path including said mechanism and said reservoir, means for supplying cleansing liquid, means for heating said liquid, means for disconnecting said second-named means from said reservoir and connecting it with said liquid supplying means for withdrawing liquid therefrom through said second-named means, a connection from the discharge of said second-named means for delivering cleansing liquid to said sheet-coating mechanism, and means for returning liquid after application thereof to said sheet-coating mechanism either to said reservoir or to a receptacle independent of said reservoir.

16. Apparatus for applying adhesive to sheets comprising, in combination with sheet-coating mechanism including a sheet-engaging roll, means for supplying adhesive to said roll, a reservoir for adhesive, a pump effecting flow of adhesive in a path including said mechanism and said reservoir, means for supplying cleansing liquid, means for heating said liquid, means for disconnecting said pump from said reservoir and connecting it with said liquid supplying means for withdrawing liquid therefrom through the pump, a connection from the discharge of said pump for delivering cleansing liquid to said sheet-coating mechanism, and means directly connecting said liquid supplying means, in a path excluding said pump, to said sheet-coating mechanism for applying cleansing liquid thereto.

WALTER T. BAILEY.